United States Patent
Nakata

[19]

[11] Patent Number: 6,043,852

[45] Date of Patent: *Mar. 28, 2000

[54] WIPE PATTERN GENERATING APPARATUS

[75] Inventor: Tetsuro Nakata, Kanagawa, Japan

[73] Assignee: Sony Corporation, Tokyo, Japan

[ * ] Notice: This patent is subject to a terminal disclaimer.

[21] Appl. No.: 07/670,867

[22] Filed: Mar. 18, 1991

[30] Foreign Application Priority Data

Mar. 16, 1990 [JP] Japan ........................................ 2-64388
Mar. 16, 1990 [JP] Japan ........................................ 2-64389

[51] Int. Cl.$^7$ .................................................. H04N 9/74
[52] U.S. Cl. ........................................... 348/594; 348/593
[58] Field of Search ...................................... 348/594, 595, 348/598, 590, 591, 593, 587; 345/190; H04N 9/76, 9/75, 5/272, 5/275, 9/74, 5/03

[56] References Cited

U.S. PATENT DOCUMENTS 4,954,898  9/1990  Nakata ...................................... 348/583
5,051,734  9/1991  Lake, Jr. .................................. 345/190
5,225,824  7/1993  Yamamoto et al. ...................... 345/190

*Primary Examiner*—Michael H. Lee

*Attorney, Agent, or Firm*—Jay H. Maioli

[57] ABSTRACT

A wipe pattern generating apparatus includes a first memory for storing polar coordinate data of the contour of a wipe pattern, a polar coordinate data forming unit for forming polar coordinate data indicating the position of the pixels on a display screen of a display unit, and a comparator for comparing distance data of the contour of the wipe pattern read out from the first memory on the basis of angle data outputted from the polar coordinate data forming unit and distance data outputted from the polar coordinate data forming unit, for forming switching data. The apparatus also includes a second memory for storing polar coordinate data of a portion of the wipe pattern contour within the range of 0° to 360°. The polar coordinate data of the entire wipe pattern contour formed on the basis of the polar coordinate data of the portion of the wipe pattern contour stored in the second memory are written in the first memory to allow to produce a wipe pattern of a desired shape with a lesser memory capacity. The apparatus also includes a modulating unit for modulating the angle data outputted from the polar coordinate data forming unit with the distance data. The polar coordinate data of the contour of the wipe pattern stored in the memory are read out with the aid of the modulated angle data to generate a spiral wipe pattern.

4 Claims, 9 Drawing Sheets

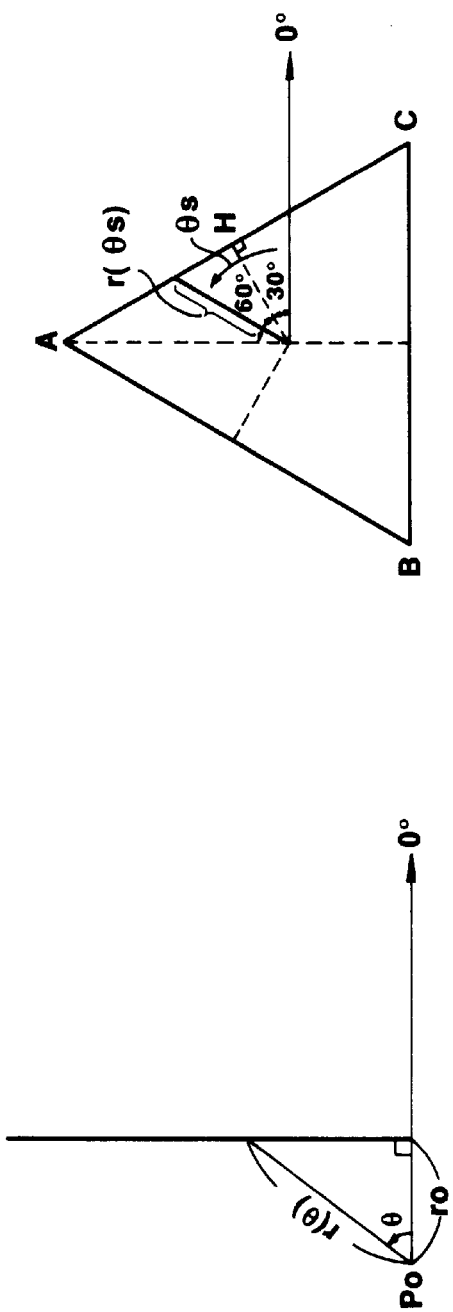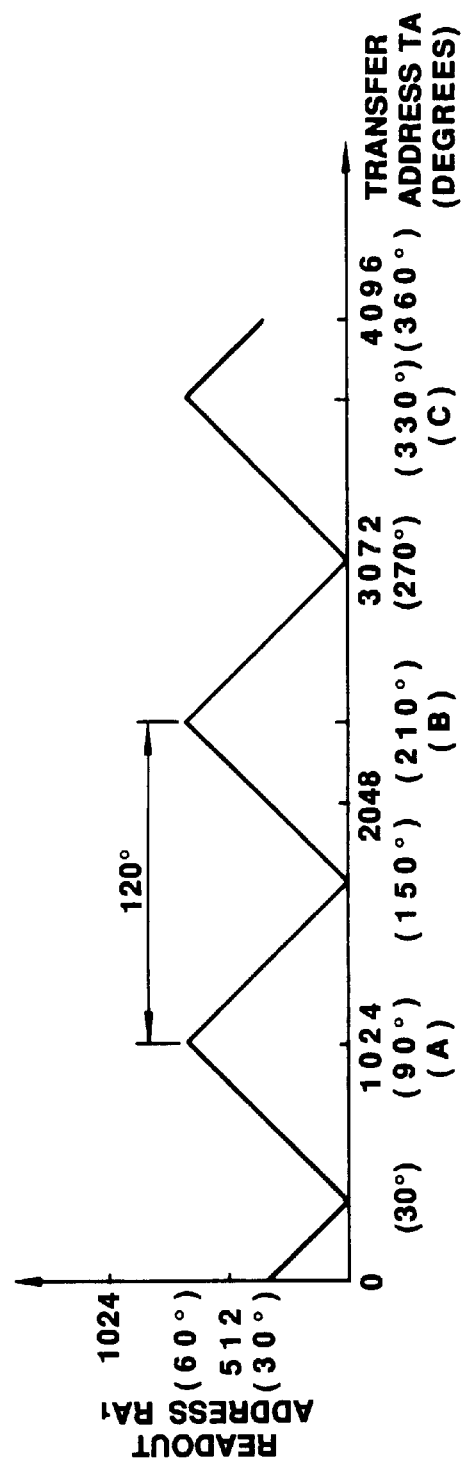

WIPE PATTERN GENERATING APPARATUS

BACKGROUND OF THE INVENTION

1. Field of the Invention

This invention relates to a wipe pattern generating apparatus employed for producing special image effects.

2. Prior Art

There is known a display converting technique in which an auxiliary image is displayed within a so-called wipe pattern having one of various contours, such as rectangular or circular contour, on the main image displayed on the display screen of a television receiver.

The conventional wipe pattern generator adapted for generating a wipe pattern employed in the display converting technique is arranged as shown in FIG. 1.

In the wipe pattern generating apparatus shown in FIG. 1, when a wipe pattern of a polygon, for example, a regular triangle, is to be produced, three plane generators 1, 2 and 3 generate three planes corresponding to the three sides other than the bottom side of a regular triangular pyramid. A non-additive mixing (NAM) circuit 4 processes the three planes by a so-called NAM processing and takes a minimum value to form a regular triangular pyramid as shown in FIG. 2. That is, rectangular coordinate data (x, y, h) within the three-dimensional space of the respective planes of the regular triangular pyramid are obtained by the NAM circuit 4.

On the other hand, serrated wave generating circuit 5 and 6 generate serrated waves H and V with the aid of horizontal sync signals HD and vertical sync signals VD. A coordinate converting circuit 7 generates rectangular coordinate (x, y) indicating the pixel position on the screen with the aid of the data HD and VD.

Referring to FIG. 2, an operating circuit 8 calculates the height $h_1$ of the regular triangular pyramid for rectangular coordinate data $(x_1, y_1)$ from the coordinate conversion circuit 7, with the aid of rectangular coordinate data $(x_1, y_1, h_1)$ of each of the planes of the regular triangular pyramid from the NAM circuit 54.

In a comparator 9, the height $h_1$ of the regular triangular pyramid for the rectangular coordinate data $(x_1, y_1)$ from the operating circuit 8 is compared with a fader level $h_{th}$. A signal which becomes "1" of $h_1 \geq h_{th}$ and "0" otherwise is outputted from the comparator circuit 9 as a wipe pattern W. Thus the shape of the sectional surface at a height shown by the fader level $h_{th}$ proves to be the wipe pattern W. By changing the fader level $h_{th}$, the size of the wipe pattern in the form of a regular triangle can be changed to achieve the above mentioned display conversion.

Meanwhile, with the above mentioned wipe pattern generator, three plane generators 1, 2 and 3 are necessary to generate the wipe pattern of the regular triangle, as explained above, while four plane generators are necessary to generate the wipe pattern of a square. That is, an N number of plane generators are necessary to generate an N-gonal wipe pattern. However, an increase in the number of sides of the regular polygon results an increase in the number of hardware items.

There has also been known a wipe pattern generator as disclosed for example in U.S. Pat. No. 4,954,898, in which data indicating the contour of a wipe pattern of a predetermined shape expressed by polar coordinates, referred to hereinafter as polar coordinate data, are previously stored in a memory, the rectangular coordinate data indicating the positions of the pixels on the screen are converted into polar coordinate data, the radius vector of the contour of the wipe pattern stored in the memory, referred to hereinafter as distance data, are read out using the deflection angle of the polar coordinate data, referred to hereinafter as angle data, and the distance data thus read out are compared to the distance data of the polar coordinate data of the pixels to generate the wipe pattern. That is, the wipe pattern is generated on the basis of judgment as to whether the positions of the pixels on the screen are within or outside of the contour of the wipe pattern stored in the memory. The distance data read out from the memory are also multiplied by a coefficient data to change the wipe pattern size, thereby converting the display on the screen.

However, with the above described wipe pattern generator, for generating the wipe pattern of a plurality of shapes, such as regular triangular, square or heart shapes, it is necessary to provide a memory for storing polar coordinate data indicating the contours of as many different kinds of wipe patterns. However, if the number of kinds of the wipe patterns to be generated is increased, it is necessary to provide a memory of a larger storage capacity.

In addition, with the above described conventional wipe pattern generator employing the plane generators, it is only possible to generate a wipe pattern having a linear contour.

OBJECT AND SUMMARY OF THE INVENTION

It is therefore an object of the present invention to provide a wipe pattern generating apparatus whereby a wipe pattern of a desired shape may be produced easily with the aid of a memory of a lesser memory capacity than in a conventional wipe pattern generating apparatus in which plural kinds of the polar coordinate data of the entire wipe pattern contour need to be stored for generating the wipe pattern of the desired shape.

It is another object of the present invention to provide a wipe pattern generating apparatus whereby a spiral wipe pattern may be generated with the use of the wipe pattern shape stored in the memory without increasing the number of kinds of the wipe pattern stored in the memory for thereby diversifying the wipe pattern.

In one aspect of the present invention, polar coordinate data of a portion of a wipe pattern contour are stored in the second memory in the range of from 0° to 360°, readout addresses of the second memory and write addresses of a first memory are formed in address forming means on the basis of supporting data designed for generating the wipe pattern of the desired shape, the polar coordinate data of the portion of the wipe pattern contour stored in the second memory are repeatedly read out with the use of the readout addresses from the address forming means, and the read out polar coordinate data of the portion of the wipe pattern contour are stored in the first memory with the aid of the write addresses from the address forming means for forming the polar coordinate data of the entire wipe pattern contour in the first memory. The polar coordinate data indicating pixel positions on the display screen surface of display means are formed in polar coordinate data forming means, the distance data of the wipe pattern contour stored in the first memory are read out on the basis of the angle data from the polar coordinate data forming means, and the distance data are compared in a comparator with distance data from the polar coordinate data forming means to produce switching data to generate the wipe pattern.

With the above described wipe pattern generating apparatus of the present invention, a wipe pattern of a desired form may be formed easily with the use of a memory of a lesser memory capacity than with a conventional wipe pattern generating apparatus in which a plurality of kinds of the polar coordinate data of the entire wipe pattern contour need to be stored for generating the wipe pattern of the desired form.

Above all, in preparing a polygonal wipe pattern, polar coordinated data of a line segment suffice as the data to be stored in the second memory, so that the memory capacity can be reduced correspondingly.

By adding an offset to the readout addresses of the memory storing the wipe pattern contour, the polygonal wipe pattern can be changed continuously to a star-shaped wipe pattern.

In another aspect of the present invention, the polar coordinate data of the wipe pattern are stored in a memory, polar coordinate data indicating the pixel positions on the display screen of display means are formed in polar coordinate data forming means, angle data are modulated in modulation means with distance data outputted from polar coordinate data forming means, distance data of the wipe pattern contour read out from the memory are compared in a comparator with the distance data outputted from the polar coordinate data forming means on the basis of the modulated angle data for generating a spirally deformed wipe pattern.

In this manner, the spiral wipe pattern may be generated easily without increasing the number of the kinds of the polar coordinate data of the wipe pattern contour stored in the memory. In other words, a spiral wipe pattern may be generated without increasing the memory capacity.

BRIEF DESCRIPTION OF THE DRAWINGS

FIG. 4 shows an example of distance data r(θ) stored in the graphic ROM in the wipe pattern generating apparatus shown in FIG. 3.

FIG. 5 is a diagram showing the relation between the transfer address TA supplied to a buffer memory and the readout address $RA_1$ supplied to the graphic ROM.

FIG. 6 shows polar coordinate data of the wipe pattern contour stored in the buffer memory of the apparatus shown in FIG. 3.

DETAILED DESCRIPTION OF PREFERRED EMBODIMENTS

Figure 1:
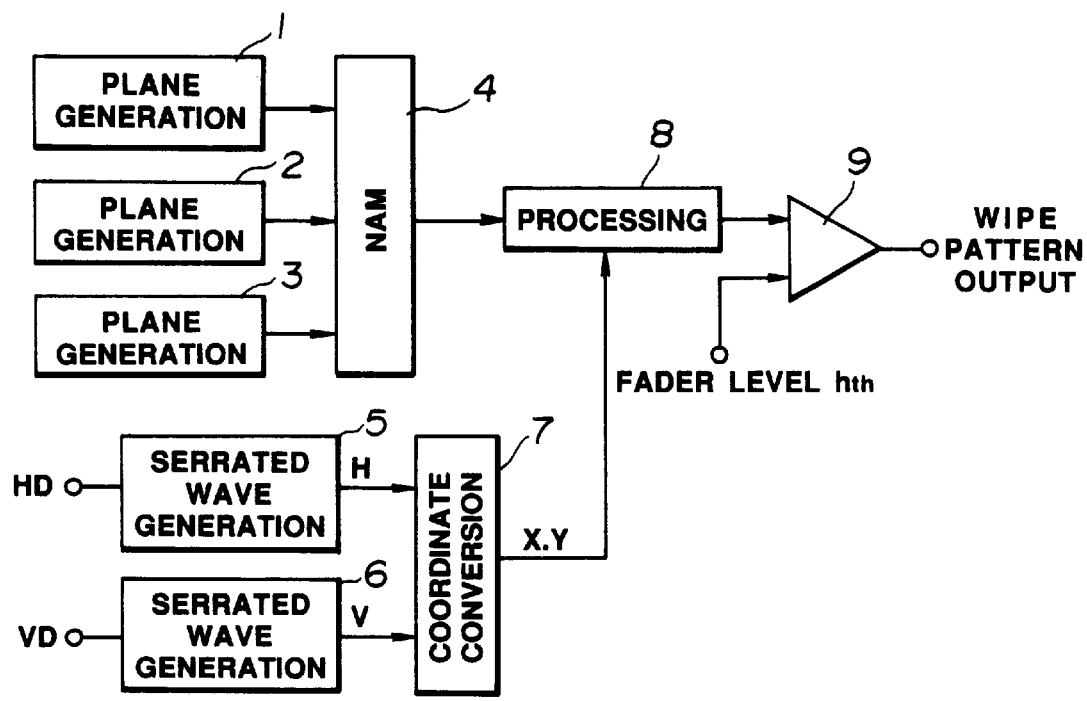
FIG. 1 is a block diagram showing an arrangement of a conventional wipe pattern generating apparatus.
Figure 2:
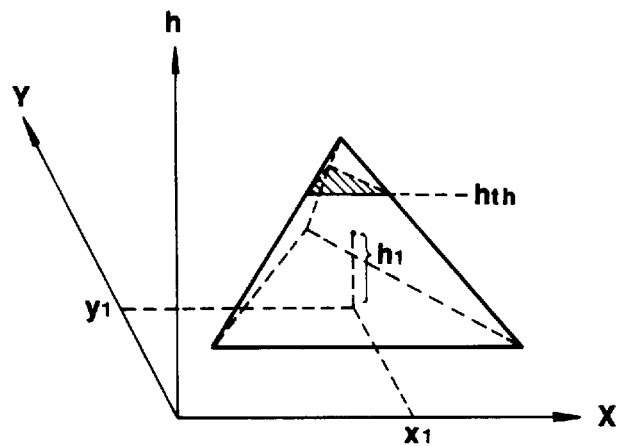
FIG. 2 shows a regular triangular pyramid formed by a NAND circuit in the apparatus shown in FIG. 1.

By referring to the drawings, illustrative embodiment of the present invention will be explained in detail.

Figure 3:
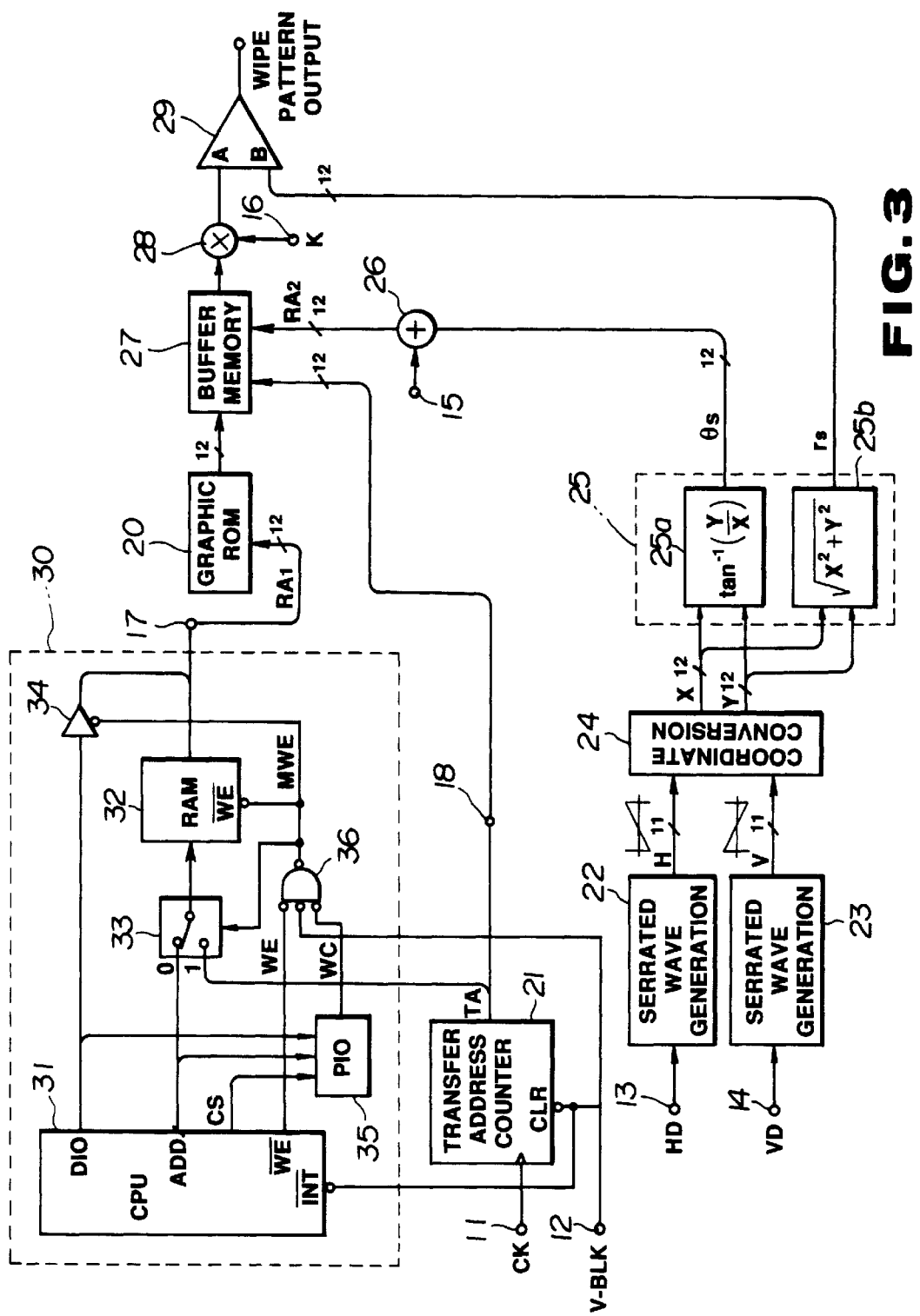
FIG. 3 is a block diagram showing a typical arrangement of a wipe pattern generating apparatus according to an embodiment of the present invention.

The wipe pattern generator according to the present invention is constructed as shown for example in FIG. 3.

In this figure, a graphic ROM 20 is a memory for storing a portion of the contour of a wipe pattern within the range of 0° to less than 360° with the aid of polar coordinate data. For generating a polygonal wipe pattern, for example, a segment of a line having a distance $r_0$ from a pole, referred to hereinafter as the origin, may be expressed by using a deflection angle in the range from 0° to less than 90°, referred to hereinafter as the angle data, and a radius vector $r_θ$, referred to hereinafter as the distance data. The angle less than 90° corresponds to the maximum length of a side of the wipe pattern contour. The distance data r(θ) are stored in the graphic ROM 20 with the angle data θ as addresses. Thus the line segment may be expressed by the polar equation r(θ)=$r_0$/cos θ wherein θ is an angle such that 0≦θ<90°. In the graphic ROM 20, the distance data r(θ) associated with the angle data θ are stored.

A transfer address counter 21 is a $2^{12}$ counter (4096-mal counter), for example, which executes a counting operation, with system clock signals CK, supplied from a terminal 11, as clock signals, and with interrupt signals V-BLK synchronized with the vertical sync signals supplied via terminal 12, as clear signals, thereby generating transfer addresses TA for the angular extent of 0° to 360°. The transfer address TA, obtained by the transfer address counter 21, is supplied to an address converter 30, while being supplied to a buffer memory 27 via terminal 18.

The address converter 30 is adapted for converting the transfer addresses TA for the angular extent of 0° to 360° from transfer address counter 21 into readout addresses $RA_1$ for the angular extent of the angle data σ of the time segments stored as polar coordinate data in the graphic ROM 20. The readout addresses RA1 obtained by the address converter 30 are supplied to the graphic ROM 20.

On the other hand, serrated wave generators 22 and 23 are adapted for generating, by means of horizontal sync signals HD and vertical sync signals VD, supplied thereto via terminals 13 and 14, respectively, serrated waves H and V, synchronized with the sync signals HD and VD, respectively. The serrated waves H and V, generated by these serrated wave generators 22 and 23, respectively, are supplied to a coordinate converting circuit 24.

The coordinate converting circuit 24 generates rectangular coordinate data (x, y), indicating the positions of the pixels on the screen, with the aid of the serrated waves H and V from the serrated wave generating circuits 22 and 23. The rectangular coordinate data (x, y) obtained from the coordinate converting circuit 24 are supplied to a polar coordinate converting circuit 25.

The polar coordinate converting circuit 25 is constituted by an angle calculating circuit 25a and a distance calculating circuit 25b and adapted for converting the rectangular coordinate data (x, y) from the coordinate converting circuit 24 into polar coordinate data. Thus the angle calculating circuit 25a and the distance calculating circuit 25b calculate the angle data $\theta_S$ and the distance data $r_S$ of the polar coordinate system, with the aid of the rectangular coordinate data (x, y), in accordance with the formulas $$\theta_S = \tan^{-1}(y/x)$$

and $$r_S = (x^2 + y^2)^{1/2}$$

The angle data $\theta_S$, obtained from the angle calculating circuit 25a, are supplied to an addition circuit 26, while the distance data $r_S$, obtained from the distance calculating circuit 25b, are supplied to a comparator circuit 29.

The addition circuit 26 adds an address offset, supplied thereto via terminal 15, to the angle data $\theta_S$ from the angle calculating circuit 25a, and transmits the angle data, added to by the address offset, to the buffer memory 27 as readout address $RA_2$. If the address offset is zero, the angle data $\theta_S$ are directly transmitted as the readout address $RA_2$ to the buffer memory 27. The wipe pattern may be rotated by adding the address offset in this manner if necessary. In the following description, it is assumed that this address offset is zero.

The buffer memory 27 stores, with the aid of the transfer address TA from the transfer address counter 21, the distance data $r(\theta)$ read out from the graphic ROM 20 with the use of the readout address $RA_1$ from the address converter 30. In other words, the distance data $r(\theta)$ of a line segment, read out repeatedly from graphic ROM 20 with the use of the readout address $RA_1$ converted from the transfer address TA, are stored in the buffer memory 27 with the aid of the transfer address TA associated with the angular extent of 0° to 360°, for storing the distance $r(\theta)$ for the wipe pattern contour in its entirety.

The distance data $r(\theta)$ of the entire wipe pattern contour stored in the buffer memory 27 are read out with the use of the readout addresses $RA_2$ from the addition circuit 26, that is the angle data $\theta_S$ with the zero address offset, and the thus read out distance data $r(\theta_S)$ are supplied via multiplication circuit 28 to the comparator circuit 29.

The comparator circuit 29 compares the distance data $r(\theta_S)$ supplied from the multiplication circuit 28 with the distance data $r_S$ ($=(x^2+y^2)^{1/2}$) from the distance calculating circuit 25b. If, as a result of comparison, $r_S \geq r(\theta_S)$, a point or pixel on the screen, represented by the rectangular coordinate data (x, y), is determined to be outside the wipe pattern contour, and "1" is outputted from the comparator circuit 29. If $r_S < r(\theta_S)$, the point on the screen represented by the rectangular coordinate data (x, y) is determined to be within the wipe pattern contour, and "0" is outputted from the comparator circuit 29. Meanwhile, if it is desired to magnify or contract the wipe pattern, a magnification factor k supplied via terminal 16 to the multiplication circuit 28 is changed and the distance data $r(\theta_S)$ is multiplied by k to generate the wipe pattern with the desired magnification factor.

Thus, in a wipe pattern generating apparatus of the present embodiment, which is constituted by the buffer memory 27 as a first memory storing the polar coordinate data of the wipe pattern contour, the polar coordinate converting circuit 25 as polar coordinate data forming means for forming the polar coordinate data indicating the positions of the pixels on the display screen of display means, and the comparator circuit 29, as the comparator for comparing the distance data of the wipe pattern contour read out from the buffer memory 27 on the basis of the angle data outputted from the circuit 25 and the distance data outputted from the polar coordinate converting circuit 25 to form switching data, the aforementioned graphic ROM 20 is used as a second memory for storing the polar coordinate data of a portion of the wipe pattern contour in the range of from 0° to less than 360°, and an address former, adapted for forming the readout address of the graphic ROM 20 and the write address of the buffer memory 27 on the basis of instruction data for forming the desired wipe pattern is constituted by the transfer address counter 21 and the address converter 30.

An illustrative arrangement and the operation of the address converter 30 will be hereinafter explained. The address converter 30 is a processing circuit for preparing addresses which may, be used for reading out one-side data stored in the graphic ROM 20 after conversion into three side data of a regular triangle, for example, which is to be generated.

In FIG. 3, the address converter 30 is constituted by devices 31 to 36, wherein the device 31 is a CPU and the device 36 is an inverting-input NAND circuit 36. For generating the wipe pattern of a desired shape, the CPU 31 sequentially stores the addresses for graphic ROM 20 corresponding to the wipe pattern shape, that is the readout addresses $RA_1$, in a random access memory 32 (RAM).

The CPU 31 is responsive to a "0" input of the interrupt signal V-BLK, synchronized with the vertical sync signal supplied via terminal 12, to sequentially supply 4,096 consecutive addresses for 0° to 360° from an address port (ADD) to RAM 32 via switch 33, as well as to calculate 4096 data which, when a wipe pattern of a regular triangle is to be generated, is changed in the form of a triangle and in which the initial value is a value equivalent to 30° of the transfer address TA, the period is a value equivalent to 120° of the transfer address TA and the amplitude is a value equivalent to 60° of the transfer address TA, referred to hereinafter as 30°-equivalent value, 120°-equivalent value and as 60°-equivalent value, respectively, as shown in FIG. 5, and to transmit these values from data port DIO via tristate buffer 34 sequentially to RAM 32. At this time, a parallel input/output port (PIO) circuit 35 decodes the above mentioned consecutive 4096 addresses, 4096 data and control signal CS from CPU 31 and sets a write control signal WC to be supplied to the inverting input NAND circuit 36 to zero. When the interrupt signal V-BLK, write control signal WC and the write enable signal WE from CPU 31 become "0" simultaneously, a memory write enable signal MWE, supplied to RAM 32, switch 33 and tristate buffer 34, is set to "zero".

Thus the switch 33 is controlled to select an address from CPU 31, while the tristate buffer 34 is controlled to supply the data calculated in CPU 31, that is the readout address RA1, to RAM 32, so that the readout address $RA_1$ as shown for example in FIG. 5 is sequentially stored in RAM 32.

Then, when the interrupt signal V-BLK is "1", the readout addresses $RA_1$, stored in RAM 32 are read out sequentially. That is, when the interrupt signal V-BLK becomes "1", the memory write enable signal MWE, which is an output from the inverting-input NAND circuit 36, becomes "1". As a result, RAM 32 is controlled to be in a readout state, switch 33 is controlled to transmit the transfer address TA from transfer address counter 21 to RAM 32 and the output of the tristate buffer 34 is controlled to offer a high impedance. Thus the readout addresses $RA_1$ stored in RAM 32 are read out sequentially in synchronism with the transfer addresses TA, that is the counts of the transfer address counter 21. In other words, the transfer addresses TA are converted into readout addresses $RA_1$.

These readout addresses RA1 are supplied to the graphic ROM 20, so that the distance data r(θ) of the line segment representing a portion of the wipe pattern contour are read out, as described above, from graphic ROM 20, at the same time that the distance data r(θ) are stored in the buffer memory 27 with the transfer addresses TA from the transfer address counter 21 as the addresses. That is, the transfer addresses TA for storing the distance data r(θ) in the buffer memory 27 are associated with the angle of 0° to 360°, the readout addresses $RA_1$ to be supplied to graphic ROM 20 are associated with the angle of 0° to 60° and the distance data r(θ) of the line segment stored in graphic ROM 20 are read out a plural number of times so as to store the distance data r(θ) of the entire wipe pattern contour in buffer memory 27. For example, by using the readout addresses $RA_1$ changed in the form of a triangular wave in the range of 0° to 60° as shown in FIG. 5, the distance data r(θ) from the center of a regular triangle as an origin to plural points on one side of the triangle are sequentially stored in buffer memory 27, with the transfer addresses TA as the addresses, as shown in FIG. 6. It is noted that a point (A) corresponding to the transfer address TA of 90° in FIG. 5 corresponds to an apex A of the regular triangle shown in FIG. 6, while the points (B) and (C) in FIG. 5 correspond to apices B and C of the regular triangle.

The distance data r(θ) representing the contour of the wipe pattern contour stored in the buffer memory 27 are read out by the angle data $θ_S$ from the polar coordinate converting circuit 25. The read out distance data $r(θ_S)$ are compared at the comparator circuit 29 with the distance data $r_S$ from the polar coordinate converting circuit 25 and the results of comparison are outputted as the wipe pattern.

With the above described embodiment, the polar coordinate data for a portion of the wipe pattern contour are stored in graphic ROM 20 within an angle of 0° to 360°, and the transfer addresses TA from the transfer address counter 21 are converted by address converter 30 into the readout addresses $RA_1$ of the graphic ROM 20. With the use of the graphic readout addresses $RA_1$, the distance data r(θ) representing a portion of the wipe pattern contour are read out repeatedly from the graphic ROM 20 and, with the use of the transfer addresses TA, the distance data r(θ) are stored in buffer memory 27. The distance r(θ) representing the stored wipe pattern contour in its entirety and the distance data $r_S$ representing the positions of the pixels on the display screen from the polar coordinate converting circuit 25 are compared with each other in the comparator circuit 29 to generate the wipe pattern. In this manner, the volume of the polar coordinate data for the previously stored wipe pattern contour and hence the memory capacity may be diminished.

By forming various readout addresses $RA_1$ by the address converter 30, a wipe pattern of a desired shape representing a line segment constituting a portion of the wipe pattern contour stored in graphic ROM 20 may be generated easily.

Figure 7:
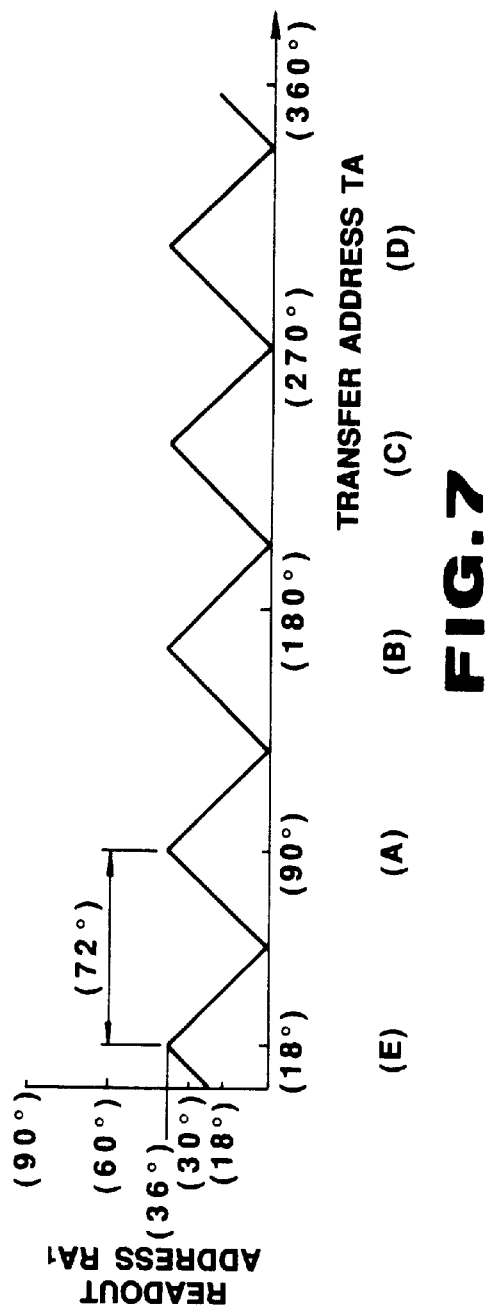
FIG. 7 is a diagram showing another relation between the transfer address TA and the readout address $RA_1$ in the apparatus shown in FIG. 3.
Figure 8:
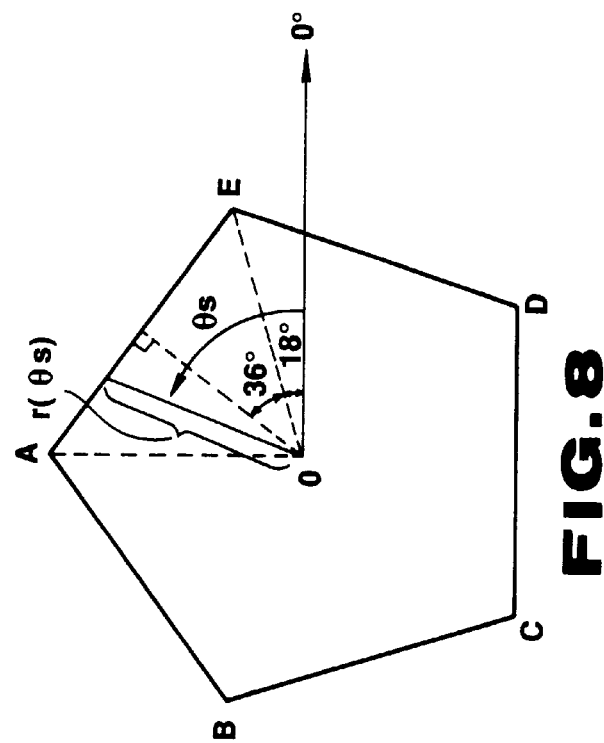
FIG. 8 shows polar coordinate data of the wipe pattern contour stored in the buffer memory with the use of the transfer address TA and the readout address $RA_1$ having the relation shown in FIG. 7.

For example, by using the readout address $RA_1$ in the form of a triangular wave having a 18°-equivalent value, a 72°-equivalent value and a 36°-equivalent value as the initial value, period and the amplitude, respectively, as shown in FIG. 7, it is possible to generate the wipe pattern of a regular polygon as shown in FIG. 8.

Figure 9:
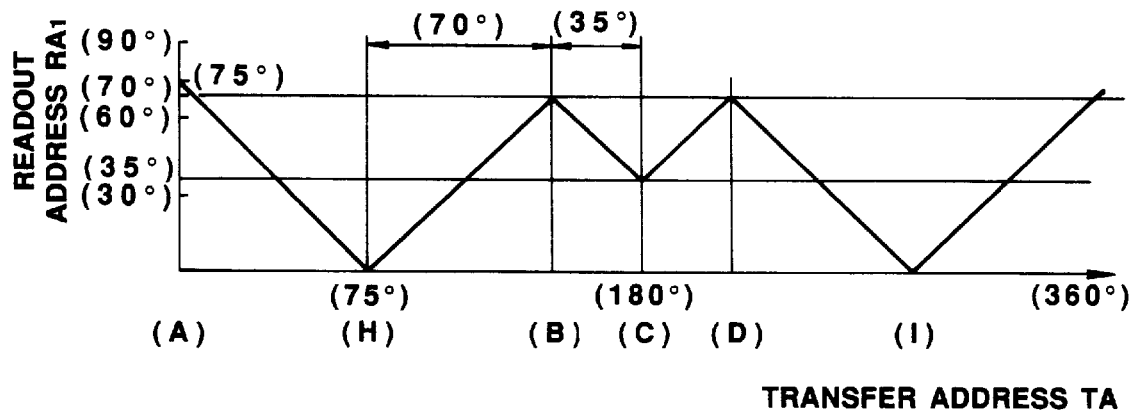
FIG. 9 is a diagram showing still another relation between the transfer address TA and the readout address $RA_1$ in the apparatus shown in FIG. 3.
Figure 10:
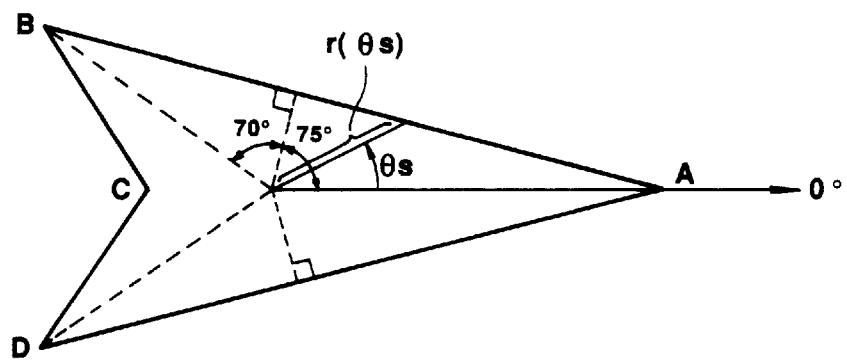
FIG. 10 shows polar coordinate data of the wipe pattern contour stored in the buffer memory with the use of the transfer address TA and the readout address $RA_1$ having the relation shown in FIG. 9.

Also, as shown for example in FIG. 9, by using 4096 readout addresses $RA_1$ which, with the initial value of the readout address $RA_1$ equal to a 75°-equivalent angle, are equivalent to angles represented by −TA+75°, TA −75°, −TA +215°, TA −145°, −TA +285° and TA −285° when the transfer address TA corresponds to 0° to 75°, 75° to 145°, 145° to 180°, 180° to 215°, 215° to 285° and 285° to 360°, respectively, it is possible to generate a wipe pattern in the form of concave quadrangle having an interior angle larger than 180°, as shown in FIG. 10.

Figure 11:
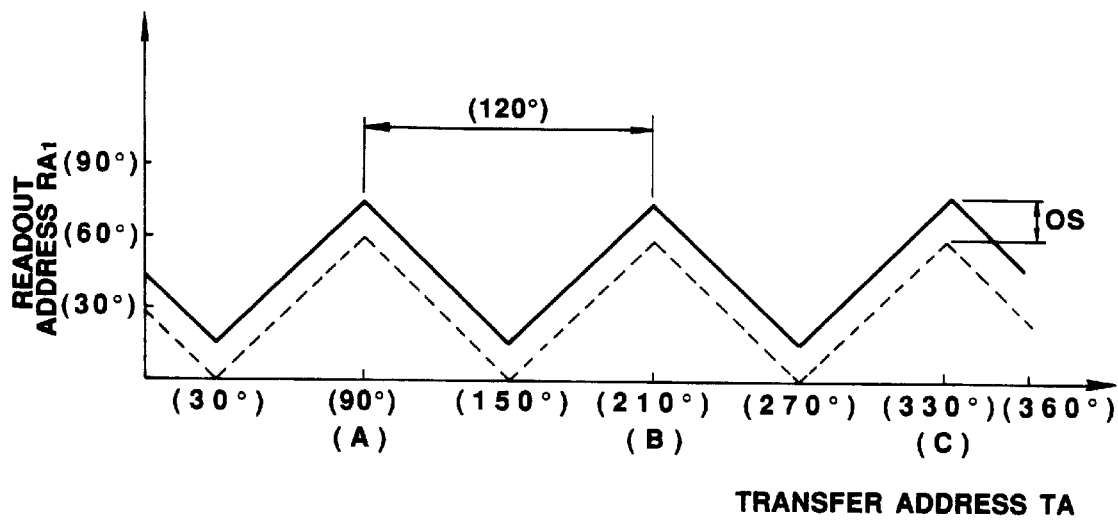
FIG. 11 is a diagram showing the relation between the transfer address TA and the readout address $RA_1$ added to by the offset in the apparatus shown in FIG. 3.
Figure 12:
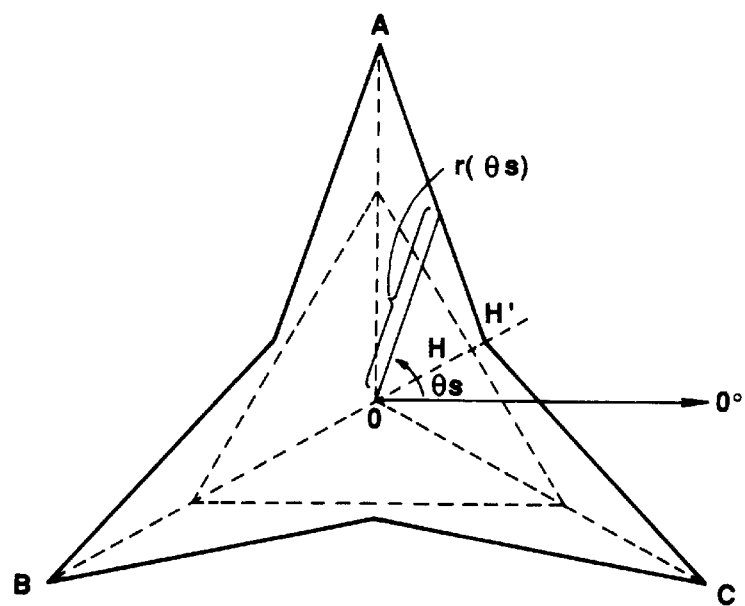
FIG. 12 shows polar coordinate data of the wipe pattern contour stored in the buffer memory with the use of the transfer address TA and the readout address $RA_1$ having the relation shown in FIG. 1.

Also, as shown for example in FIG. 11, by adding a 15°-equivalent offset to the readout address $RA_1$ shown in FIG. 5, it becomes possible to produce a star-shaped wipe pattern, that is a wipe pattern in the form of a concave hexagon having three interior angles larger than 180°, as shown in FIG. 12. It is noted that a broken line triangle in FIG. 12 represents the triangle shown in FIG. 6 and, by adding an offset OS to the readout addresses $RA_1$ as described above, the point H shifts to a point H' as shown in FIG. 12 to increase the wipe pattern size. However, by reducing the pattern size in a controlled manner, the position of the point H may be maintained constant.

Figure 13:
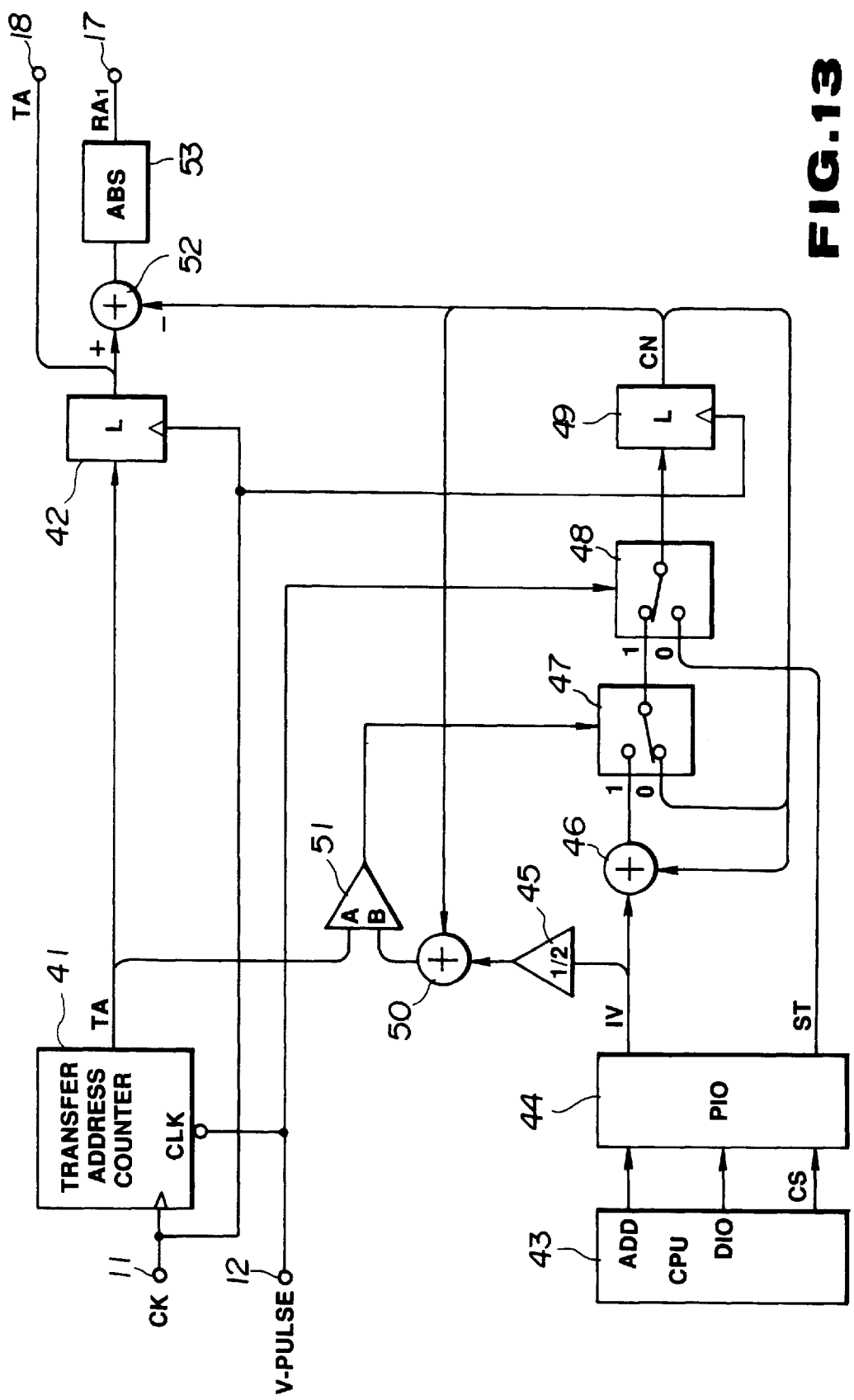
FIG. 13 is a block diagram showing another arrangement of an address converter in the apparatus shown in FIG. 3.

A modified embodiment of the address converter 30 is explained by referring to FIG. 13, which is a block diagram showing a transfer address counter 21 and the address converter 30 which are modified from those shown in FIG. 3.

In this figure, a transfer address counter 41 is a $2^{12}$-mal (4096-mal) counter, for example, which executes a counting operation, with the use as the clock signals of system clock signals CK supplied via terminal 11 and with the use as the clear signal of a pulse signal V-PULSE of a system clock width synchronized with the vertical sync signal supplied via terminal 12, for generating 4096 transfer addresses TA for the angle of 0° to 360°. This transfer address TA is latched by a latch circuit 32 during one system clock period, after which it is supplied via terminal 18 to the above buffer memory 27 shown in FIG. 3.

A CPU 43 transmits a start data ST, which is an initial value of the readout address $RA_1$, and an interval data IV, which is a period data of the readout address $RA_1$, via data port $D_{IO}$ to a parallel input/output port circuit 44 (PIO circuit), while transmitting a predetermined address and a control signal CS from an address port ADD to the PIO circuit 44. The PIO circuit 44 stores the start data ST and the interval data IV and transmits the stored interval data IV to a multiplication circuit 45 and an addition circuit 46, while transmitting the start data ST to a fixed terminal of a switch 48.

The multiplication circuit 45 multiplies the interval data IV from the PIO circuit 44 by ½ and transmits the resulting signal to an addition circuit 50.

The addition circuit 16 adds the interval data IV from the PIO circuit 44 and the output from the latch circuit 49 and transmits the resulting signal to a fixed terminal of the switch 47.

The switch 47 selects, under control of the comparator circuit 51, one of the output from the addition circuit 46 or the output of the latch circuit 49 and transmits the selected output to the other fixed terminal of the switch 48.

The switch 48 selects, under control of the pulse signal V-PULSE supplied via terminal 12, one of the outputs of the switch 47 or the start data ST, and transmits the selected data to latch circuit 49. The latch circuit 49 latches the output of the switch 48 with the aid of the system clock signal CK supplied via terminal 11.

The addition circuit 50 adds the output of the multiplication circuit 45 and the output of the latch circuit 49 to supply the resulting sum signal to the comparator circuit 51.

The comparator circuit 51 compares the transfer address TA from the transfer address counted 41 and the output of the transfer address counter 41 to perform switching control of the switch 47 as described previously.

A subtraction circuit 52 subtracts the output of the latch circuit 49 from the transfer address TA from the latch circuit 42. An absolute value circuit 53 calculates an absolute value of the output of the subtraction circuit 52 and transmits this absolute value via terminal 17 to the graphic ROM 20 shown in FIG. 3 as the aforementioned readout address $RA_1$.

The above described address converter operates in the following manner.

If it is desired to generate a wipe pattern of a regular triangle, the start data ST and the interval data IV are set by CPU 43 to values equivalent to 30° and 120° of the transfer addresses TA, respectively referred to hereinafter as the 30°-equivalent value and 120°-equivalent value, respectively, and supplied to PIO circuit 44. When the pulse signal V-PULSE, supplied via terminal 12, becomes "zero" in synchronism with the vertical sync signal, the transfer address counter 41 starts counting from zero, as shown for example by a straight line TA in FIG. 14. The switch 48 is controlled at this time to select the start data ST from PIO circuit 44 so that the 30°-equivalent value is latched in latch circuit 49. As a result, the output of the addition circuit 50 proves to be a value equivalent to (60°+30°)=90°, while the output of the comparator circuit 51 becomes "0" until the transfer address TA from the transfer address counter 41 becomes a 90°-equivalent value. The latch circuit 49 holds the 30°-equivalent value as center data CN representing the step waveform shown in FIG. 14.

As the counting of the transfer address counter 41 proceeds and the transfer address TA becomes a 90°-equivalent value, the output of the comparator 51 is inverted to "1". The switch 47 is controlled to select the output of the addition circuit 46 so that a value equivalent to (120°+30°)=150° is latched in the latch circuit 49. As a result, the output of the addition 50 becomes a value equivalent to (60°+150°)=210°, while the output of the comparator circuit 51 is again inverted and kept at "0" until the transfer address TA corresponds to 210° and the latch circuit 49 maintains the 150°-equivalent value (center data CN shown in FIG. 14).

When the counting by the transfer address counter proceeds further and the transfer address TA reaches a 210°-equivalent value, the output of the comparator circuit 51 is inverted to "1", while the switch 47 is controlled to select the output of the addition circuit 46, so that the value equivalent to (120°+150°)=270° is latched in the latch circuit 49. As a result, the output of the addition circuit 50 becomes a value equivalent to (60°+270°)=330°, while the output of the comparator circuit 51 is again inverted and kept at "0" until the transfer address TA becomes a 330°-equivalent value. The latch circuit 49 continues to hold the 270°-equivalent value, as the center data CN shown in FIG. 14.

When the counting operation by transfer address counter 41 proceeds further and the transfer address TA reaches the 270°-equivalent value, the output of the comparator circuit 51 is inverted to "1" and the switch 47 is controlled to select an output of the addition circuit 46 so that a value equivalent to (120+270)°=390° is latched in the latch circuit 49. As a result, the output of the addition circuit 50 becomes a value equivalent to (60°+390°)=450°. The output of the comparator circuit 51 is again inverted and remains at "0" until the transfer address TA becomes equivalent to 360°, while the latch circuit 49 continues to hold a 390°-equivalent value (center data shown in FIG. 14).

Figure 14:
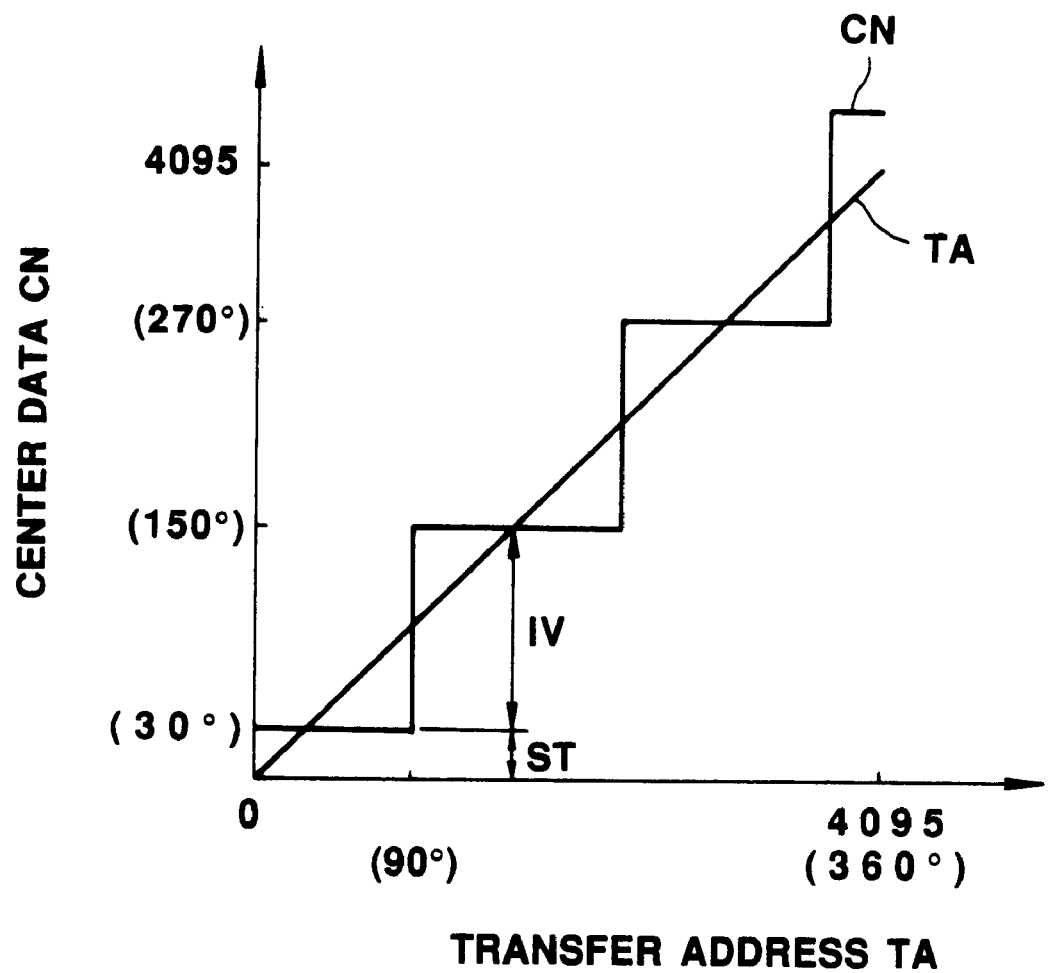
FIG. 14 shows the relation between the center data CN and the transfer address TA of the address converter shown in FIG. 13.

Thus the output of the latch circuit 49 becomes a step wave as the center data CN shown in FIG. 14. The subtraction circuit 52 subtracts the output of the latch circuit 49 from the transfer address TA supplied via latch circuit 42, while the absolute value circuit 53 calculates the absolute value of the output of the subtraction circuit 52. Thus the absolute value circuit 53 calculates 4096 data changed in the form of a triangular wave having an initial value, a period and an amplitude equivalent to 30°, 120° and 60° of the transfer address TA, respectively, that is the readout addresses $RA_1$, and transmits the calculated data to the graphic ROM 20.

Thus, with the above described address converter, it becomes possible, by changing the interval data IV, to form the readout address $RA_1$ of the graphic ROM 20 for generating the desired regular polygonal wipe pattern. In addition, by reading out the distance data r(θ) of a partial contour of the wipe pattern stored in graphic ROM 20 a number of times with the aid of the readout address $RA_1$, as described above, the distance data r(θ) of the overall contour of the wipe pattern of the desired shape may be formed easily within the buffer memory 27.

The present invention is not limited to the above described embodiments. For example, the partial contour of the wipe pattern stored in graphic ROM 20 may also be a curve instead of a straight line segment, as in the above described embodiments.

Figure 15:
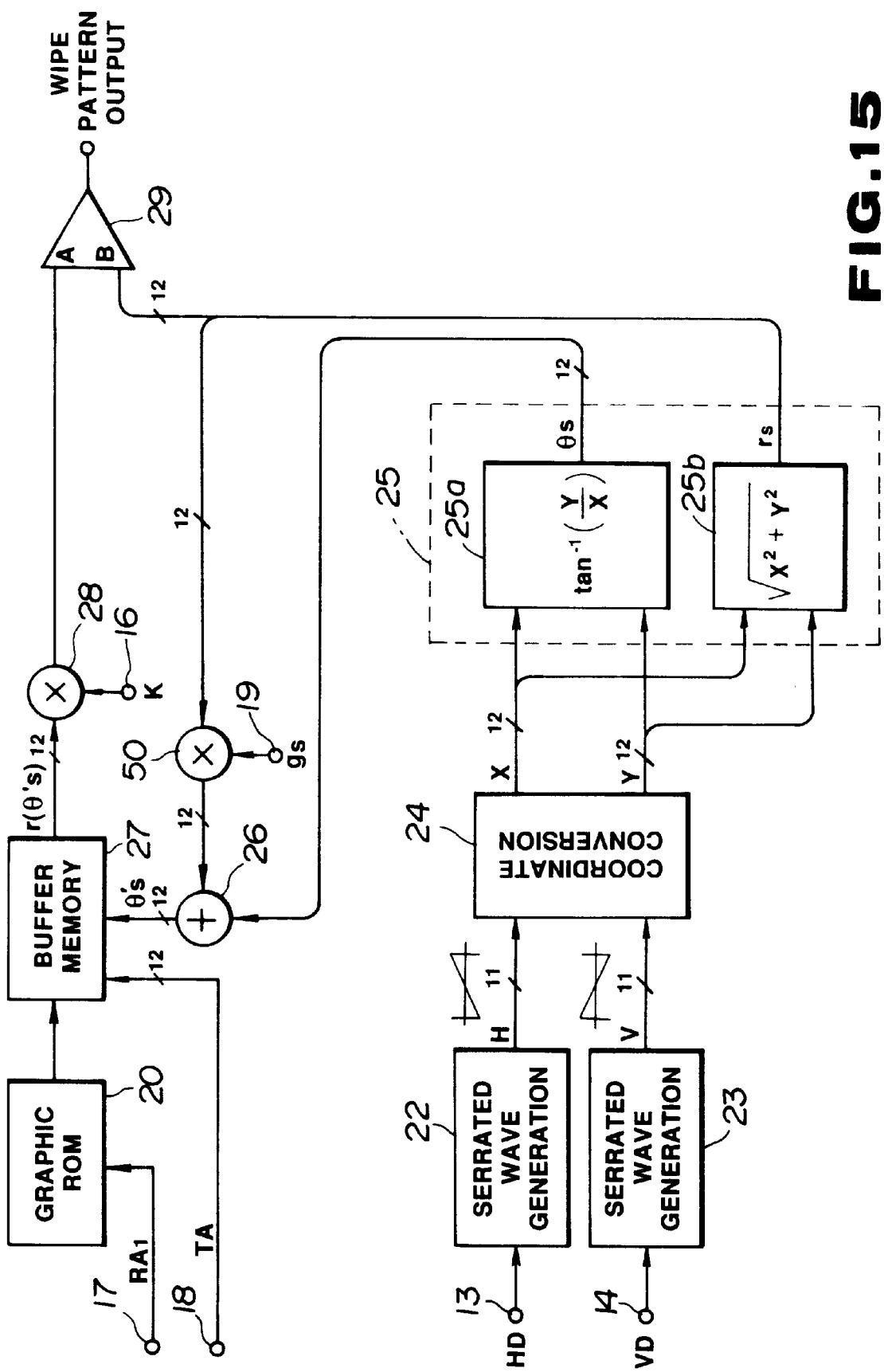
FIG. 15 is a block diagram showing a typical arrangement of a wipe pattern generating apparatus according to another embodiment of the present invention.

A new effect may be produced by a wipe pattern generator shown for example in FIG. 15, in which data based on the distance data $r_S$ obtained by distance calculating circuit 25b of the polar coordinate converting circuit 25 are used as address offset data supplied to the addition circuit 26 via terminal 15.

Referring to FIG. 15, the polar coordinate converting circuit 25 supplies the angle data $\theta_S$ obtained by angle calculating circuit 25a to the addition circuit 26, while supplying the distance data $r_S$ obtained from distance calculating circuit 25b to the comparator circuit 29 and supplying the data $r_S$ via multiplication circuit 50 to the addition circuit 26.

The multiplication circuit 50 multiplies the distance data $r_S$ from the distance calculating circuit 25b by a spiral gain $g_S$ supplied via terminal 19.

The addition circuit 26 adds the distance data $r_S$ multiplied by spiral gain $g_S$ from the multiplication circuit 50 to the angle, data $\theta_S$ from the angle calculating circuit 25a. That is, the readout address $\theta_S'$, which is the output from the addition circuit 26, may be expressed by the formula $$\theta_S' = \theta_S + g_S \times r_S$$

This readout address $\theta_S$ is supplied to the graphic ROM 20 so that the distance data $r(\theta_S')$ of the contour of the wipe pattern contour stored in the graphic ROM 20 are read out.

The operation of the above described wipe pattern generating apparatus is hereinafter explained.

For example, if the spiral gain $g_S$ supplied to the multiplication circuit 50 via terminal 19 is zero, the readout address $\theta_S'(=\theta_S + g_S \times r_S)$ equals the angle data $\theta_S$, so that the addition circuit 26 directly supplies the angle data $\theta_S$ from the angle calculating circuit 25a to the buffer memory 17a. As a result, the distance data $r(\theta_S)$ of the wipe pattern contour stored in buffer memory 17 are read out, so that a star-shaped wipe pattern is outputted from comparator circuit 29. On the other hand, if the spiral gain $g_S$ supplied via terminal 17 to the multiplication circuit 50 is set to an arbitrary value other than zero, the readout address $\theta_S'(=\theta_S + g_S \times r_S)$ is increased or decreased with increase in the distance data $r_S$. That is, if the spiral gain $g_S$ is a positive value, the readout address $\theta_S'$ is increased when the distance data $r_S$, that is the position of the pixel on a display surface, is further away from the origin, whereas, if the spiral gain $g_S$ is a negative value, the readout address $\theta_S'$ is decreased as the pixel position on the display surface is further away from the origin.

Meanwhile, it may occur that, with the number of bits of the address of the buffer memory 17 equal to 12 bits, the output of the addition circuit 26 be in excess of 12 bits. However, by disregarding the bits in excess of 12 bits, with the readout address $\theta_S'$ being a 370°-equivalent value, the readout address $\theta_S'$ becomes a 10°-equivalent value, so that the distance data $r(\theta_S')$ may be read out without obstructions from the buffer memory 17.

By reading out the distance data $r(\theta_S')$ of the wipe pattern contour from the buffer memory 17 with the aid of the readout address $\theta_S'$ modulated with the distance data $r_S$, a spirally deformed star-shaped wipe pattern 52 may be obtained.

In this manner, by storing polar coordinate data of the wipe pattern contour read out from graphic ROM 20 in the buffer memory 27, forming polar coordinate data representing the pixel positions on the display screen of the display means in the polar coordinate converting circuit 25, modulating the angle data $\theta_S$ with the distance data $r_S$ outputted from the polar coordinate converting circuit 25 by the addition circuit 26 and the multiplication circuit 50 to calculate the readout address $\theta_S'$, and comparing the distance data $r(\theta_S')$ of the wipe pattern contour read out from buffer memory 27 with the aid of the readout address $\theta_S'$ and the distance data $r_S$ outputted from the polar coordinate converting circuit 25 in the comparator circuit 29 to generate the wipe pattern, the spirally deformed wipe pattern may be obtained. In other words, the spiral wipe pattern may be generated easily without increasing the kinds of the polar coordinate data of the wipe pattern contour stored in graphic ROM 20.

What is claimed is:

1. A wipe pattern generating apparatus, comprising:
    a buffer memory for temporarily storing polar coordinate data of an entire contour of a desired wipe pattern,
    polar coordinate data forming means for forming polar coordinate data indicating a position of a pixel on a display screen of display means, and
    a comparator for comparing distance data of the entire contour of the wipe pattern read out from said buffer memory on the basis of angle data outputted from said polar coordinate data forming means and distance data outputted from said polar coordinate data forming means, for forming switching data,
    wherein the improvement resides in that the wipe pattern generating apparatus further comprises
        a graphic memory for storing the polar coordinate data of a portion of the contour of the desired wipe pattern, and
        an address former for forming readout addresses for said graphic memory and write addresses for said buffer memory on the basis of instruction data generated therein adapted to form the desired wipe pattern comprising multiple copies of said portion of the contour of the desired wine pattern,
        said buffer memory being adapted for storing the polar coordinate data of the entire contour of the desired wipe pattern formed on the basis of the polar coordinate data of the portion of the contour of the wipe pattern stored in said graphic memory.

2. The wipe pattern generating apparatus according to claim 1 wherein said address former comprises a write address generating circuit for generating write addresses of said buffer memory, and a readout address generating circuit for generating readout addresses of said graphic memory on the basis of the write addresses from said write address generating circuit.

3. The wipe pattern generating apparatus according to claim 1 further comprising modulating means for modulating the angle data outputted from said polar coordinate data forming means with distance data outputted from said polar coordinate data forming means,
    the distance data of the contour of the wipe pattern being read out from said buffer memory on the basis of said angle data modulated by said modulating means so as to be supplied to said comparator.

4. A wipe pattern generating apparatus, comprising:
    a memory for storing polar coordinate data of the contour of a wipe pattern,
    polar coordinate data forming means for forming polar coordinate data indicating positions of a plurality of pixels on a display screen of display means, and
    a comparator for comparing distance data of the contour of the wipe pattern read out from said memory on the basis of angle data outputted from said polar coordinate data forming means and distance data outputted from said polar coordinate data forming means, for forming switching data,
    wherein the improvement resides in that the wipe pattern generating apparatus further comprises
        modulation means for modulating said angle data outputted from said polar coordinate forming means with said distance data outputted from said polar coordinate data forming means,
        said distance data of the contour of the wipe pattern being read out from said memory on the basis of said angle data modulated by said modulating means so as to be supplied to said comparator.

* * * * *